(12) United States Patent
Matsuhashi

(10) Patent No.: US 7,413,248 B2
(45) Date of Patent: Aug. 19, 2008

(54) ACOUSTIC STRUCTURE OF SEAT BACK

(75) Inventor: Masahiro Matsuhashi, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 79 days.

(21) Appl. No.: 11/413,048

(22) Filed: Apr. 28, 2006

(65) Prior Publication Data

US 2007/0257529 A1    Nov. 8, 2007

(51) Int. Cl.
*A47C 7/62* (2006.01)

(52) U.S. Cl. .................. 297/217.4; 297/217.3

(58) Field of Classification Search ............. 297/217.1, 297/217.2, 217.3, 217.4, 452.12, 452.62; 5/904

See application file for complete search history.

(56) References Cited

U.S. PATENT DOCUMENTS

| | | | | |
|---|---|---|---|---|
| 4,064,376 A | * | 12/1977 | Yamada | 381/152 |
| 5,314,403 A | * | 5/1994 | Shaw | 601/148 |
| 5,387,026 A | * | 2/1995 | Matsuhashi et al. | 297/217.4 |
| 5,649,739 A | * | 7/1997 | Zapf | 297/301.1 |
| 5,951,110 A | * | 9/1999 | Conner et al. | 297/452.31 |
| 6,929,324 B2 | * | 8/2005 | Enomoto et al. | 297/217.3 |
| 7,077,405 B2 | * | 7/2006 | Akpom | 280/47.38 |
| 7,159,938 B1 | * | 1/2007 | Shiraishi | 297/217.4 |

FOREIGN PATENT DOCUMENTS

| | | |
|---|---|---|
| JP | 2002-346476 | 12/2002 |
| JP | 2004-097654 | 4/2004 |

* cited by examiner

*Primary Examiner*—David R Dunn
*Assistant Examiner*—Erika Garrett
(74) *Attorney, Agent, or Firm*—Browdy and Neimark

(57) ABSTRACT

An acoustic structure of seat back includes a suspension board element provided therein. The suspension board element, which has a speaker unit provided to a backward surface thereof, is resiliently provided in a seat back frame of the seat back. A sound-conductive cushion element of a flat plate configuration is juxtaposed on a forward surface of the suspension board element. Those seat back frame and sound-conductive cushion element are covered with a foam padding and a trim cover assembly to thereby form such an acoustic seat back structure wherein all the suspension board element, speaker unit and sound-conductive cushion element are resiliently supported within the seat back, as an acoustic and vibration generator unit effective for imparting sound and vibration directly to a back portion of seat occupant.

6 Claims, 2 Drawing Sheets

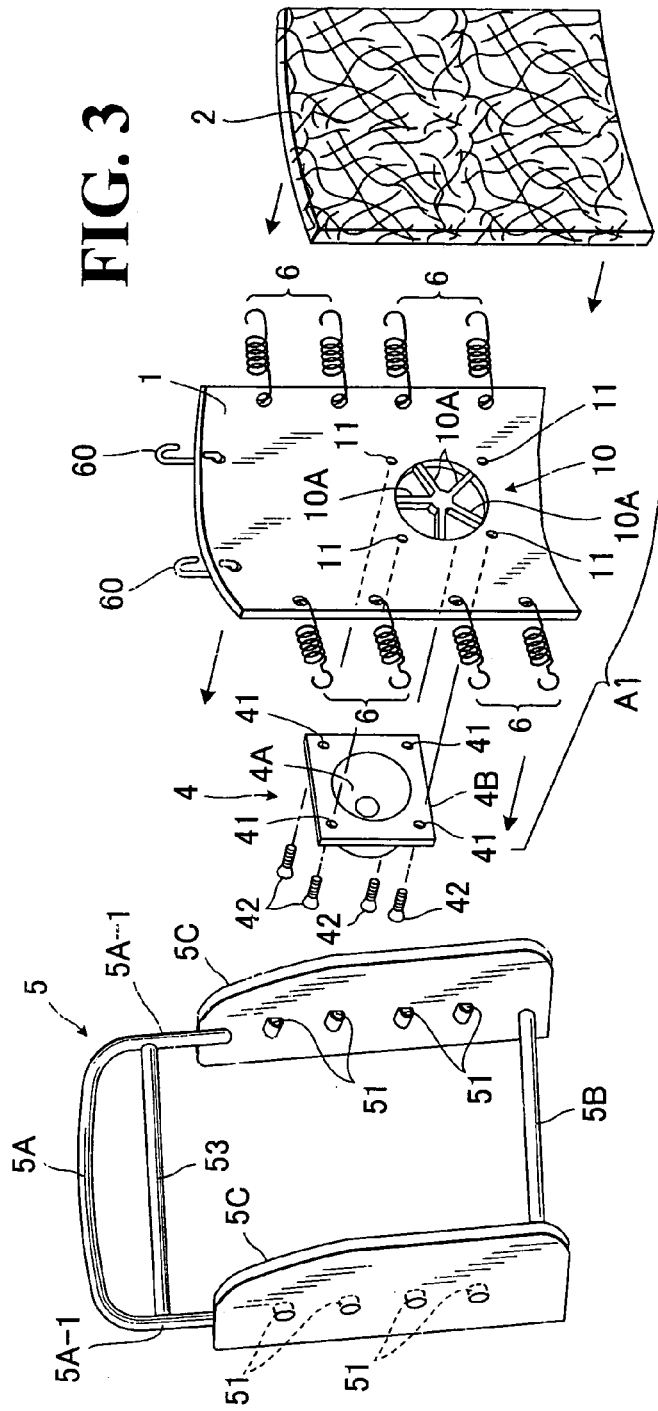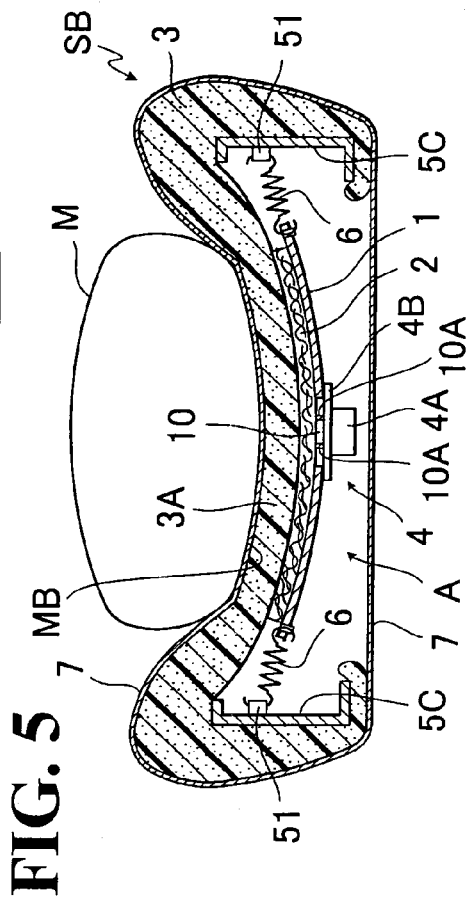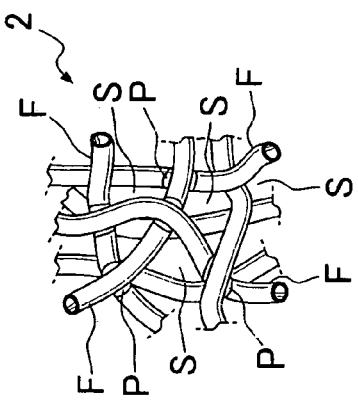

ACOUSTIC STRUCTURE OF SEAT BACK

BACKGROUND OF THE INVENTION

1. Field of the Invention

The present invention relates to a sound system in an automotive seat, and in particular to an acoustic structure of seat back provided with speakers, wherein a sound is emitted from speakers to an occupant on the seat.

2. Description of Prior Arts

There has been known an automotive seat of the type having speakers provided therein, which allows a sound, such as music, to be emitted from the speakers directly to an occupant on the seat, so that the occupant can fully enjoy the sound with both his or her ears and body. In this kind of seat, as disclosed from the Japanese Laid-Open Patent Publication No. 2002-346476, the speakers are provided behind a cushion material forming one constituent element of the seat so as to be in contact with a reverse side of the cushion material. While not taught in that literature, normally, the speakers are secured to a spring element typically provided in the seat.

The foregoing conventional acoustic structure of seat has, however, been found defective in that:

(i) the cushion material used is a foam padding material formed from urethane foam for optimal cushioning effect, but, is not suited for imparting the sound therethrough because of its property of absorbing sound and degrading acoustic effect, and (ii) the sound emitted from each speaker is limited to a region which is substantially compassed by a diameter of the speaker itself, and such limited range of sound emission is directed to the back of an occupant on the seat, as a result of which, the occupant can not enjoy the music satisfactorily, and can not feel such vivid sound as if the music was performed in a real concert hall, neither, due to the foregoing sound absorption by the foam cushion material.

On the other hand, as known from the Japanese Laid-Open Patent Publication No 2004-97654, there is a seat having exposed speakers in its seat back to enable direct emission of sound to an occupant on the seat. According thereto, a through-bore is formed in both of foam cushion material and top cover member of the seat back and a speaker is secured in the through-bore, so that a frontal side of the speaker is exposed from the frontal surface of seat back and directly faces toward the seat occupant. However, such exposed speakers interfere with the occupant's movement, thus impairing a comfortable seating condition of the seat, and further, the range of sound emission from such exposed speaker arrangement is limited to a narrow space around the seat occupant, so that the occupant can not fully enjoy the sound or music with his or her body.

SUMMARY OF THE INVENTION

In view of the above-stated drawbacks, it is a purpose of the present invention to provide an improved acoustic structure of seat back which allows for wide expansion of a sound emitted from speakers in seat back to an entire area of back of a seat occupant, thereby giving the occupant a splendid impression as if the music was actually and vividly played, while allowing not only for decrease of thickness of the seat back, but also for provision of a high cushion effect and a high air permeability.

In order to achieve such purpose, the acoustic structure of seat back in accordance with the present invention is basically comprised of:

a padding formed in conformity with a predetermined outer shape of said seat back;

a seat back frame provided in said padding;

a suspension plate element supported by said seat back frame in suspended manner, said suspension plate having a forward surface facing to a side forwardly of the seat back and a backward surface facing to a side backwardly of the seat back;

a speaker unit fixedly provided to said backward surface of said suspension plate element;

a sound-conductive cushion means of a flat plate configuration which is juxtaposed on said forward surface of said suspension plate element; and a trim cover assembly covering said padding and said sound-conductive cushion means.

Preferably, the suspension plate element may be formed from a synthetic resin material in a three-dimensional manner.

Preferably, the sound-conductive cushion means may comprise a network cushiony element which is formed by deforming a straw-like fiber and fusing a plurality of points of said straw-like fiber to provide a network cushiony structure therein.

Other various features and effects of the present invention will become apparent from reading of the descriptions, hereinafter, with reference to the annexed drawings.

BRIEF DESCRIPTION OF THE DRAWINGS

FIG. 3 is an exploded perspective of a principal part of the present invention;

FIG. 4 is an enlarged view showing a detailed structure of sound-conductive cushion element in the present invention; and FIG. 5 is a sectional view showing the state where a seat occupant uses the seat back in accordance with the acoustic structure of the present invention.

DETAILED DESCRIPTION OF PREFERRED EMBODIMENTS OF THE INVENTION

Referring to FIGS. 1 to 5, there is illustrated a preferred exemplary mode of an acoustic structure of seat back, as generally designated by (A), in accordance with the present invention. Designation (S) denotes a typically known vehicle seat including a seat back (SB) in which the acoustic structure (A) is provided, which shall hereinafter be referred to as "seat-back acoustic structure (A)".

It is noted that the term, "forward" or "forwardly", refers to a side (F) forwardly of the seat (S), whereas the term, "backward" or "backwardly", refers to a side (B) backwardly of the seat (S).

The seat back (SB) typically comprises a seat back frame (5) and an upholstery covering the seat back frame (5), the upholstery consisting of a trim cover assembly (7) and a foam padding (3).

Figure 1:
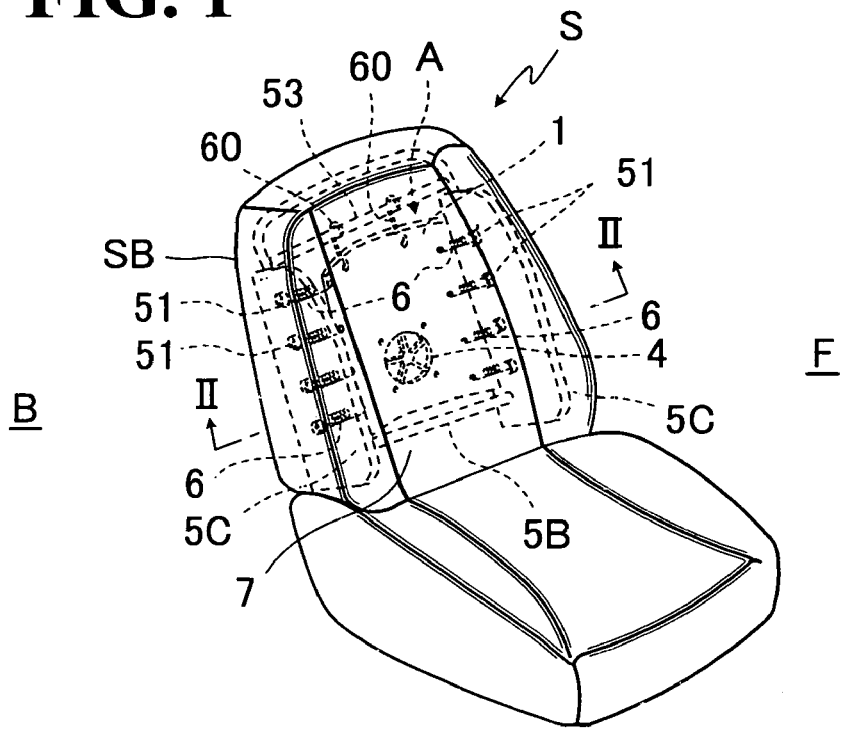
FIG. 1 is a schematic perspective of a vehicle seat to which an acoustic structure seat back of the present invention is applied.

As can be seen from FIG. 1, while not designated, the seat back (SB) itself is of the known configuration wherein a central backrest area is slightly recessed with respect to a pair of lateral bolster portions so as to embracingly support the upper portion of a seat occupant (M) as well as his or her two shoulder and arm portions. Hence, as understandable from FIG. 2, in conformity with such predetermined contour of seat back (SB), the foam padding (3) is formed with: a relatively thin central region (3A) corresponding to the central backrest area of the seat back; and a pair of relatively thick bolster regions (3B) (3B) corresponding to the respective pair of lateral bolster portions of the seat back. It is noted that the padding (3) is formed from a urethan foam material having an air permeability.

Figure 2:
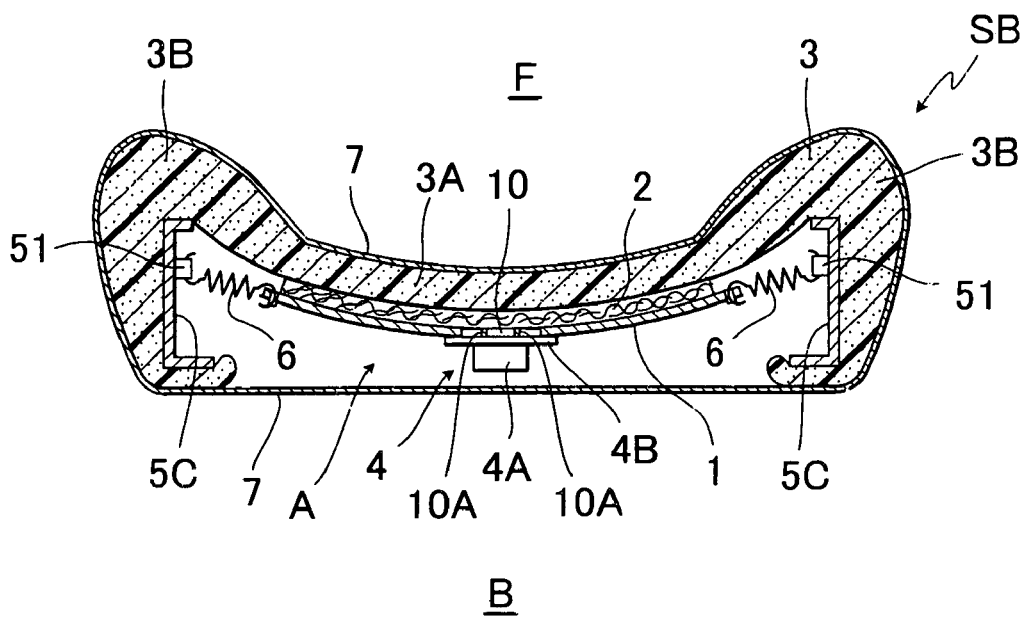
FIG. 2 is a sectional view taken along the line 11-11 in FIG. 2.

As best shown in FIG. 3, the seat back frame (5) is formed by: a generally inverted-U-shaped upper frame portion (5A); a cross lower frame portion (5B); and a pair of lateral plate frame portions (5C). The upper frame portion (5A) have a pair of downwardly lateral frame sections (5A-1) (5A-1), with which are respectively fixed the two upper ends respective of the afore-said pair of lateral plate frame portions (5C). As shown, a reinforcing frame (53) is fixedly connected between those two lateral frame sections (5A-1). Basically, as seen in FIG. 2, the seat back frame (5) is covered with the foregoing foam padding (3) which is in turn covered with the trim cover assembly (7).

In accordance with the present invention, the seat-back acoustic structure (A) is provided to the forgoing conventional seat back (SB) or seat back frame (5).

Generically stated, the seat-back acoustic structure (A) includes an acoustic and vibration generator unit (A1) to be disposed in a resiliently suspended way in the seat back frame (5). The acoustic and vibration generator unit (A1) per se has a function to generate and expand a sound as well as a vibration due to the sound in a direction to a back portion of seat occupant. As one constitute element of such acoustic and vibration generator unit (A1), there is provided a suspension board element (1) having a three-dimensional surface suited for receiving an upper body portion of a seat occupant (M) on the seat (S). As far as the illustrative embodiment of seat-back acoustic structure (A) is concerned, the suspension board element (1) is formed so as to have a curved cross-section which provides a forwardly concave surface which is three-dimensional surface suited for supportively and embracingly receiving the backwardly convex back portion (MB) of a seat occupant (M) as understandable from FIGS. 2 and 3. Namely, the suspension board element (1) has a forward concave surface which is to face to the forward side (F) and a backward convex surface which is to face to the backward side (B). Preferably, the suspension board element (1) is formed from a synthetic resin material such as polypropylene.

Specifically, as best shown in FIG. 3, the suspension board element (1) is provided with a plurality of coil springs (6) at the two lateral end portions thereof and also formed with a through-hole (10) therein.

As can be seen in the FIG. 3, each of the extension coil springs (6) is at one end thereof movably engaged in a small hole (not designated) formed in one lateral end portion of the suspension board (1).

Formed integrally in the foregoing through-hole (10) are a plurality of reinforcing rib portions (10A) which are so formed as to extend continuous from the suspension board element (1) and converge to a center of the through-hole (10). Otherwise stated, the reinforcing rib portions (10A) extend radially in the through-hole (10) in a direction from a center area thereof disposed at the center of through-hole (10) towards a circular edge of the through-hole (10), thus terminating in their respective ends integral with the suspension board element (1) at that particular circular edge. This through-hole (10) is defined at a predetermined point in the suspension board element (1) in correspondence with a speaker (at 4) as will be describe later.

By virtue of such reinforcing rib portions (10A), a substantially supportive surface is extended from the suspension board element (1) to the through-hole (10), thereby preventing objectionable depression or deformation in the local area of forward surface of seat back (SB) corresponding to the through-hole (10), while permitting a sufficient emission of a sound from a speaker (at 4) therethrough.

A pair of connecting pieces (60) (60) are also provided to the upper end portion of the suspension board element (1). Namely, as can be seen from FIG. 3, each connecting piece (60) is movably engaged, at one hooked end thereof, with a hole (not designated) formed in the upper end portion of the suspension board element (1).

Further, according to the acoustic and vibration generator unit (A1), a speaker unit (4) is fixedly provided to a predetermined local region of the backward convex surface of suspension board element (1) in which the foregoing through-hole (10) is formed, whereas on the other hand, a sound-conductive cushion element (2) is securely attached on an entirety of the forward concave surface of the suspension board (1).

Specifically, the speaker unit (4) is formed by a speaker (4A) and a securing plate (4B). As understandable from FIG. 3, the speaker unit (4) is firmly attached to the afore-said predetermined local region of backward convex surface of suspension board (1) by the steps of: inserting four securing screws (42) through the respective four through-holes (41) formed in the securing plate (48): and then driving the four securing screws (42) securely in the respective four securing holes (11) formed in the suspension board (1). Thus, a whole of forward surface of the speaker (4A) (i.e. an oscillating surface or corn surface of the speaker (4A) ) faces to the through-hole (10) in a concentric relation therewith. Hence, the suspension board element (1) serves to generate a vibration through a sound emitted from the speaker unit (4) and expand the vibration as well as the sound. This is because the sound emitted from the speaker (4A) is expanded widely in the entirety of the suspension board element (1) which in turn generates and expands a corresponding vibration therefrom.

Basically, the sound-conductive cushion element (2) is a relatively thin cushiony plate material of network structure which is formed by securely knitting or entangling together a continuous hollow fiber. Specifically for example, as best shown in FIG. 4, the sound-conductive cushion element (2) is a network cushiony plate material of a relatively thin thickness which uses a hollow or straw-like fiber (F) formed from PET resin material (i.e. polyethylene terephthalate). More specifically, such straw-like fiber (F) is for example bent to provide a plurality of bent portions, and those bent portions of straw-like fiber (F) are entangled with one another, after which, a plurality of points of the bent portions are adhered to one another by means of thermal fusing, as indicated by (P), with many spaces (S) given in the thus-fabricated network structure of fiber (F). In that way, a network cushiony plate member (2) of a relatively thin thickness is formed, which has a high sound conductivity and a high cushiony effect.

Also, according to the seat-back acoustic structure (A), a plurality of securing lugs (51) are formed in an inward side of each of the two lateral frame portions (5C) of the seat back frame (5) by means of a suitable pouching, so that an engagement hole is defined in each of the securing lugs (51), which is adapted for allowing another hooked end of each of the extension coil springs (6) to be engaged therein.

Now, a description will now be made of how the above-described acoustic and vibrator unit (A1) is installed in the seat back (SB). At first, as indicated by the arrows in FIG. 3, the network cushiony plate member (2) is juxtaposed on and secured to an entirety of the forward concave surface of suspension board element (1), and then, as understandable from FIGS. 1 and 3, anther free end of the coil springs (6) is securely engaged with each of the afore-said securing lugs (51) formed in each of the two seat back frame lateral frame portions (5C), while at the same time, another hooked ends of the afore-said two connecting pieces (60) are engaged over the seat back frame reinforcing frame portion (53). Accordingly, a whole of the acoustic and vibration generator unit (A1) is disposed in the seat back frame (5) via a plurality of the springs (6) in a resiliently suspended fashion. Thereafter, as understandable from FIG. 2, the foam padding (3) is attached to the seat back frame (5), so that the center region (3A) thereof is juxtaposed on the network cushiony plate member (2), and the trim cover assembly (7) is securely attached on all outer surfaces of the foam padding (3) and the backward side of the seat back (SB).

With the above-described structure, it is to be appreciated that the following effects are attained:

(i) In the conventional acoustic structure of seat back, a speaker unit is supportively received in a support box and such support box is provided in the seat back for a certain sound and vibration effect to the back portion of a seat occupant. But, according to the present invention, a suspension board element (1) is used in place of such conventional support box. Thus, such board element (1) itself is a simple medium through which sound and vibration from the speaker unit (4) are fully expanded and directly imparted to the back portion (MB) of a seat occupant (M), in contrast to the conventional support box of three-dimensional structure which undesirably disperses sound and vibration from speaker unit and thus does not impart all of the sound and vibration directly to the seat occupant's back portion.

(ii) Further, the suspension board element (1) is so formed as to have a three-dimensionally formed surface, like the curved cross-section shown in FIG. 2 for example, which conforms to the uneven contour of seat occupant's back portion and thus embracingly support the same, as understandable from FIG. 5. This not only provides a comfortable and stable support touch to the back portion (MB) of seat occupant (M), but also effectively allows a full transmission of sound and vibration from the speaker unit (4) to an entirety of the seat occupant's back portion (MB).

(iii) The sound-conductive cushion element (2) has many spaces (S) given therein, which allows a sound emitted from the speakers to expand freely and widely, and the continuous straw-like fiber (F) effectively increases the sound conductivity therethrough in contrast to a normal fiber having no hollow therein. Those effective points provide a high sound conductivity. Such network cushiony plate member (2) expands wider than the through-hole (10) and the oscillating surface of the speaker (4A), so that a sound emitted from the speaker (4A) is diffused wider than the outer size of that speaker and therefore the sound can smoothly be expanded in the entirety of the network cushiony plate member (2).

(iv) Owing to the ideal combination of the above-described three-dimensionally formed suspension board element (1) and the sound-conductive cushion element (2), a sound and vibration from the speaker unit (4) is imparted to an entirety of seat occupant's back (MB) leaned against the seat back (SB), without being limited to a localized area of the seat occupant's back (MB). Obviously, such direct sound expansion reaches the bones of the seat occupant, so that a great depth of the expanded sound gives the seat occupant such a splendid impression as if a music was played in a real concert hall for instance.

(v) The seat back frame (SB) and sound-conductive cushion element (2) are covered with the foam padding (3) and a trim cover assembly (7) to thereby form such an acoustic seat back structure wherein all the suspension board element (1), speaker unit (4) and sound-conductive cushion element (2) are resiliently supported within the seat back (SB) by means of the springs (6), which acts to provide an optimum acoustic and vibration generator unit effective for imparting sound and vibration directly to a back portion of seat occupant.

(vi) Since both suspension board element (1) and sound-conductive cushion element (2) are quite small in thickness as seen in FIG. 2, it is possible to reduce the size and thickness of seat back (SB) as desired.

While having described the present invention so far, it should be understood that the invention is not limited to the illustrated embodiments, but any modification, replacement and addition may be applied thereto without departing from the scopes of the appended claims.

What is claimed is:

1. An acoustic structure of seat back, in which the seat back includes a backrest area for receiving a back portion of a seat occupant, comprising:

a urethane foam padding formed in conformity with a predetermined outer shape of said seat back, said padding including a central backrest area corresponding with said backrest area, said central backrest area facing forward of the seat back;

a seat back frame provided in said padding;

an acoustic and vibration generator unit for imparting sound and vibration to said back portion of said seat occupant, said acoustic and vibration generator unit being provided within said padding and disposed behind said central backrest area of the padding;

said acoustic and vibration generator unit comprising:

a suspension board element supported by said seat back frame in a suspended manner, said suspension board element having a forward surface facing forward of the seat back and a backward surface facing backward of the seat back;

a width of said suspension board element being at least equal to that of said back portion of said seat occupant;

a speaker unit fixed on said backward surface of said suspension board element;

a sound-conductive cushion element formed in a flat plate configuration of hollow fibers which has a forward surface facing forward of the seat back and a backward surface facing backward of the seat back, wherein said backward surface of said sound-conductive cushion element is juxtaposed on said forward surface of said suspension board element, and wherein a width and height of said sound-conductive cushion element is substantially equal in size to said suspension board element;

said central backrest area of said padding overlaying said forward surface of said sound-conductive cushion element, and a trim cover assembly covering said padding as well as said central backrest area of the padding.

2. The acoustic structure of seat back as claimed in claim 1, wherein said suspension board element is formed in a three-dimensional manner.

3. The acoustic structure of seat back according to claim 2, wherein said suspension board element has a three-dimensional surface which substantially conforms in shape to said back portion of said occupant which is to be leaned against said seat back.

4. The acoustic structure of seat back according to claim 2, wherein said suspension board element is formed from a synthetic resin material.

5. An acoustic structure of seat back, in which the seat back includes a backrest area for receiving a back portion of a seat occupant, comprising:
- a urethane foam padding formed in conformity with a predetermined outer surface of said seat back, said padding including a central backrest area facing forward of the seat back at a point corresponding to said backrest area;
- a seat back frame provided in said padding;
- an acoustic and vibration generator unit for imparting sound and vibration to said back portion of said seat occupant, said acoustic and vibration generator unit being provided within said padding and disposed behind said central backrest area of said padding;
- said acoustic and vibration generator unit comprising:
- a suspension board element supported by said seat back frame via an elastic connecting means in a resiliently suspended manner, said suspension board element having: at least one through-hole formed therein; a forward surface facing forward of the seat back and a backward surface facing backward of the seat back;
- a width of said suspension board element being at least equal to that of said back portion of said seat occupant;
- a speaker unit fixed on said backward surface of said suspension board element over said at least one through-hole;
- a sound-conductive cushion element formed in a flat plate configuration of hollow fibers which has a forward surface facing forward of the seat back and a backward surface facing backward of the seat back, wherein said backward surface of said sound-conductive cushion means is juxtaposed on said forward surface of said suspension board element, and wherein a width and height of said sound-conductive cushion means is substantially equal to that of said suspension board element;
- said central backrest area of said padding overlaying said forward surface of said sound-conductive cushion means, and
- a trim cover assembly covering said padding as well as said central backrest area of the padding.

6. The acoustic structure of seat back as claimed in claim 5, wherein a plurality of reinforcing rib portions are formed in said at least one through-hole.

* * * * *